March 31, 1936.  L. A. SHELDON  2,035,726

ELASTIC FLUID POWER PLANT

Filed Aug. 31, 1933  3 Sheets-Sheet 1

Mercury Temperature-Entropy Diagram.

Inventor:
Lucian A. Sheldon,
by Harry E. Dunham
His Attorney.

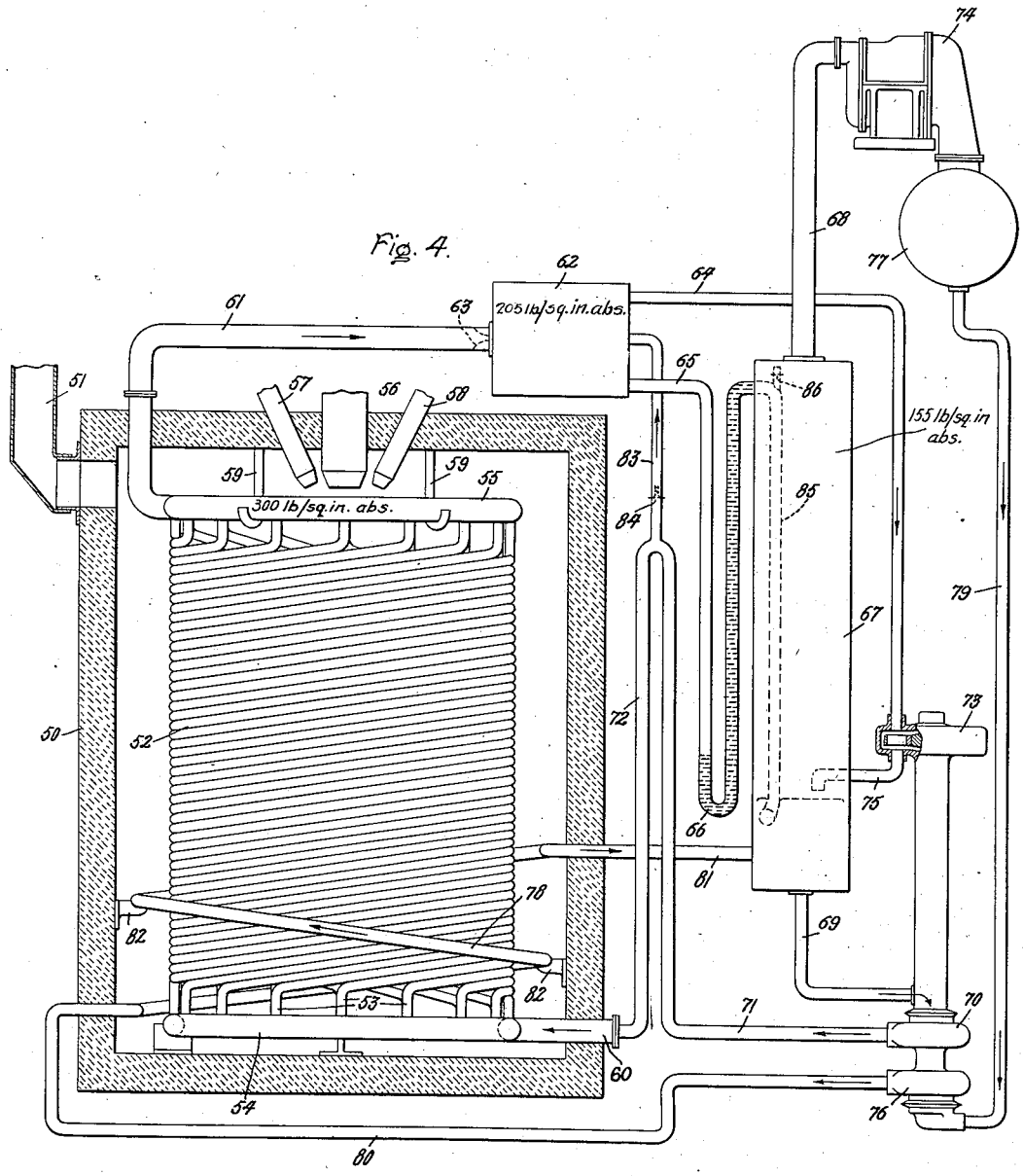

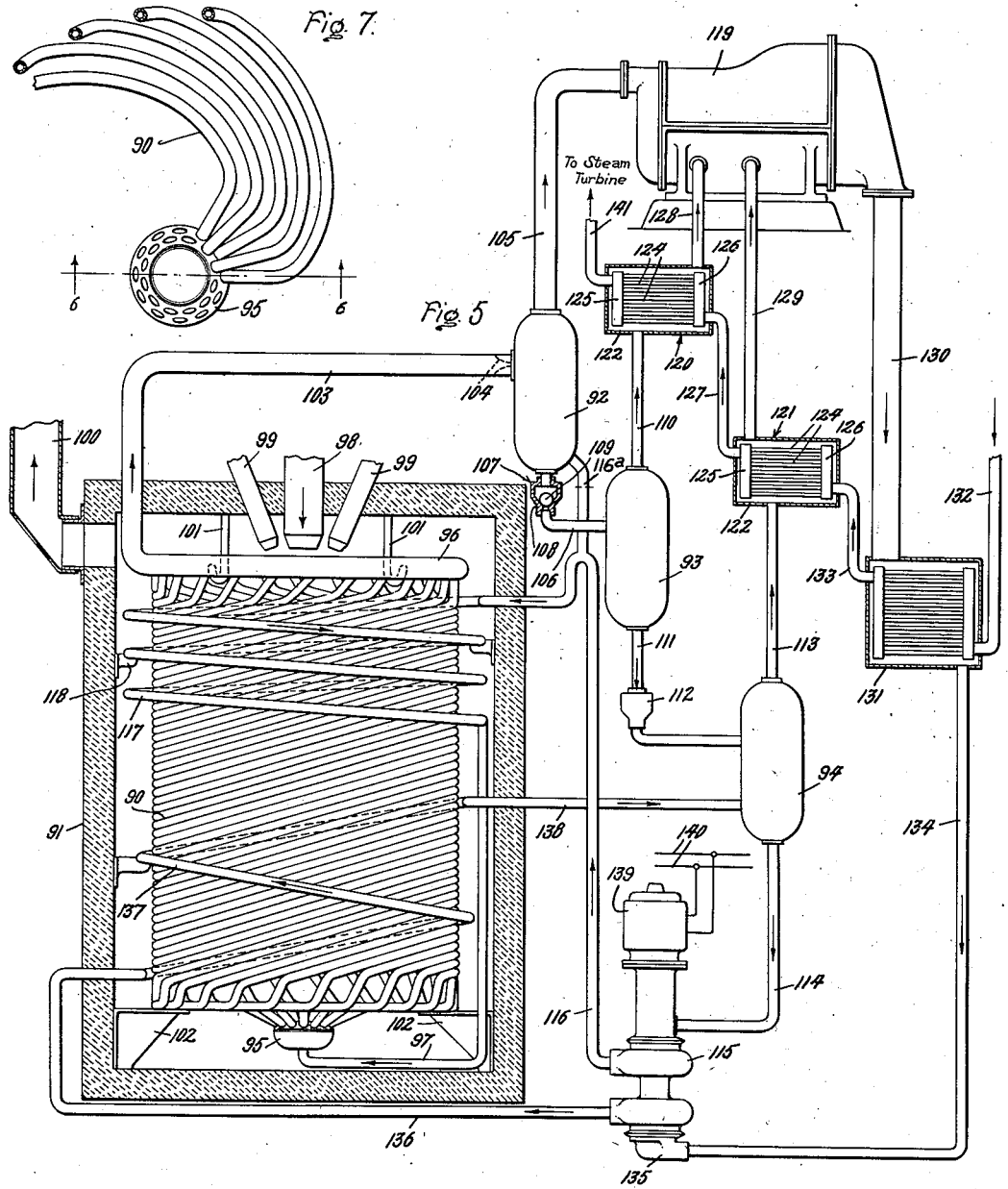

Patented Mar. 31, 1936

2,035,726

UNITED STATES PATENT OFFICE 2,035,726

ELASTIC FLUID POWER PLANT

Lucian A. Sheldon, Schenectady, N. Y., assignor to General Electric Company, a corporation of New York Application August 31, 1933, Serial No. 687,605

7 Claims. (Cl. 60—108)

The present invention relates to elastic fluid power plants comprising an elastic fluid generator or generators for heating and evaporating liquid, and a consumer or consumers receiving vapor produced in the generator.

One object of the invention is to provide an improved arrangement of elastic fluid power plants. Another object of the invention is to provide an improved arrangement for an elastic fluid generator whereby the efficiency of such plant and generator is substantially increased.

There are two methods of converting a fluid from the liquid into the gaseous or vapor state. The first method, which is generally used in the operation of elastic fluid generators, consists in heating the liquid by the transfer of heat energy from a source of heat to the liquid. The second method consists in reducing the pressure to which the fluid is subjected. For example, a volume of heated liquid under high pressure can be partly or totally evaporated if we permit such volume of liquid to expand, that is, if we reduce the pressure to which it is subjected. Whereas the first method may be termed a heating method, the second method may be termed an expansion method.

My invention is primarily based on said second method. The apparatus for carrying out the method comprises a plurality of drums or containers or tanks for containing liquid, connected in series with respect to the flow of liquid. The first of the drums is heated externally with the liquid contained therein subject to a comparatively high pressure. The liquid is passed from the first drum into a second drum in which a lower pressure is maintained, to the effect that a part of the liquid supplied from the first to the second drum evaporates in the latter. The vapor produced in the second drum is discharged to a consumer. The liquid contained in the second drum is conducted to a third drum in which a pressure is maintained lower than the pressure in the second drum, to the effect that a part of the liquid supplied to the third drum is evaporated, the vapor being discharged to a consumer, and the liquid may be supplied to a fourth drum or returned to the first drum and reheated therein.

For a better understanding of what I consider to be novel and my invention, attention is directed to the following description and the claims appended thereto in connection with the accompanying drawings.

Figure 1:
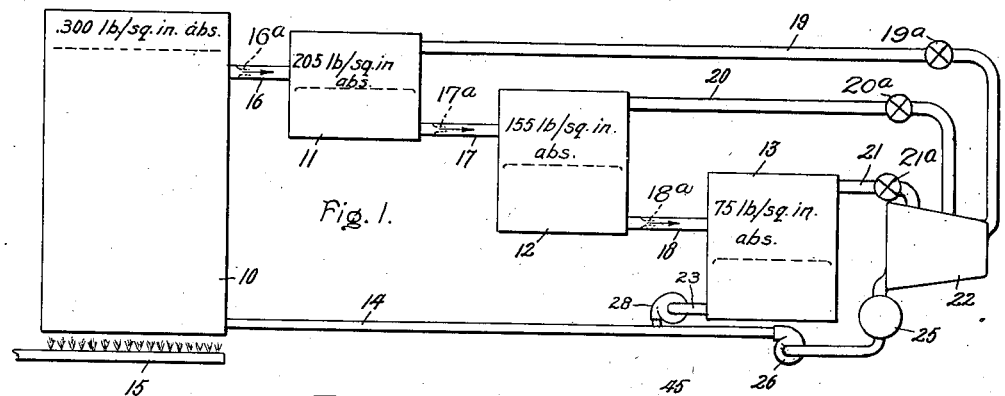
Figure 2:
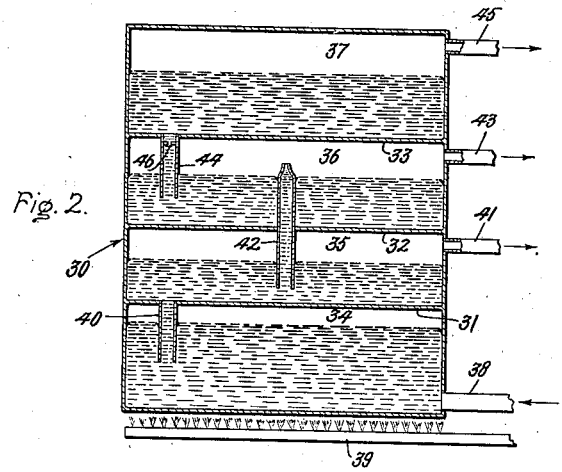
Figure 3:
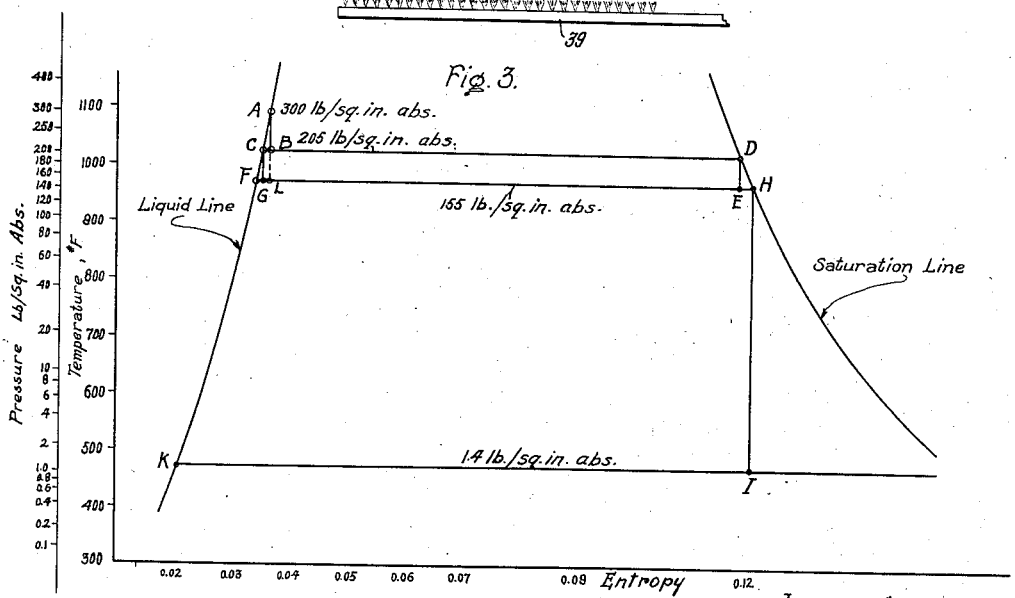

In the drawings Fig. 1 represents diagrammatically an embodiment of my invention; Fig. 2 is a modification of the arrangement shown in Fig. 1; Fig. 3 is an explanatory diagram; Figs. 4 and 5 illustrate two modifications of a power plant in accordance with my invention; and Figs. 6 and 7 show detail views of a part of Fig. 5 to an enlarged scale, Fig. 6 being a sectional view along line 6—6 of Fig. 7.

Referring to Fig. 1, where I have shown a diagrammatic illustration of a power plant comprising an elastic fluid generator and an elastic fluid consumer according to my invention, a plurality of drums or tanks or containers 10, 11, 12 and 13 for liquid to be evaporated are connected in series. The container 10 has an inlet conduit 14 for conducting liquid into the container. Heat energy is transmitted to the liquid in the container by an external source of heat, such as a burner 15. The series connection of the containers is accomplished by connecting means, such as conduits 16, 17 and 18, provided between the containers 10, 11, 12 and 13, respectively. Orifices 16a, 17a, and 18a are provided in conduits 16, 17, and 18 to maintain the pressure difference between containers 10, 11, 12, and 13. Each of the containers 11, 12 and 13 has a vapor discharge conduit 19, 20, and 21, respectively, through which vapor generated in the containers is discharged to a consumer, such as a mercury vapor turbine, in case the generator is used for producing mercury vapor. Valves 19a, 20a, and 21a control the flow in conduits 19, 20 and 21.

The liquid contained in the first container 10 is heated to a high temperature at a pressure at which little or no liquid is converted into vapor. The high pressure, high temperature liquid in container 10 is conducted to the container 11 in which a pressure lower than the pressure existing in container 10 is maintained, to the effect that a part of the liquid conducted into container 11 is evaporated. The vapor produced is discharged through the conduit 19 to a consumer, in the present instance to the first stage of a turbine 22. The liquid contained in the container 11, which has not been evaporated, is conducted to the container 12 in which a pressure is maintained lower than the pressure in the container 11. A part of the fluid supplied to the container 12 is thereby evaporated, the vapor being discharged through the conduit 20 to a second or intermediate stage of the turbine 22, and the remaining liquid is discharged into the container 13 in which a pressure is maintained lower than the pressure in the container 12 whereby a part of the liquid is evaporated in the container 13, the vapor being discharged through the conduit 21 to a third or lower stage of the turbine 22, and the remaining liquid being returned by means of a circulating pump 28 through conduits 23 and 14 to the container 10 in which it is reheated. Connected to the turbine is a condenser 25 for condensing the exhaust of the turbine, the condensate being returned to the container 10 through the conduit 14 by the action of a pump 26.

In the arrangement just described, the conversion of a fluid from the liquid into the gaseous or vapor state takes place by heating the fluid in the drum 10 to a high temperature at high pressure and conducting the fluid from the container 10 into a plurality of drums connected in series in which lower pressures are maintained. More specifically, these pressures are progressively reduced in the direction of flow of the liquid. In a specific arrangement I maintain a pressure in the first drum of the order of about 300 pounds per square inch absolute, and pressures of the orders of 205, 155 and 75 pounds per square inch absolute in the drums 11, 12 and 13, respectively. The absolute pressures per square inch have been indicated in the drawings.

From another viewpoint, I provide in accordance with my invention an elastic fluid generator in which little or no fluid is converted into vapor in the drums or containers to which heat is applied from an external source. The transfer of heat energy from the external source to the fluid is thereby considerably improved because this heat energy is transmitted to liquid having a much higher heat conductivity than vapor. Liquid absorbing heat energy at a high rate as compared with vapor therefore may be forced through the first drum at a high velocity, resulting in a highly efficient use of the boiler heating surface.

Instead of providing a plurality of separate drums connected by conduit means, such drums or containers may be united into a single compact structure, as shown in Fig. 2, in which the elastic fluid generator comprises a container 30 divided by walls or partitions 31, 32 and 33 into a plurality of compartments 34, 35, 36 and 37, respectively, corresponding to the drums 10, 11, 12 and 13 of Fig. 1. Liquid is conducted to the first compartment 34 by a conduit 38. The liquid in this first compartment is heated by an external source, shown as a burner 39, to a high temperature and subjected to a pressure at which little or no liquid is evaporated within the compartment 34. Liquid is forced from the compartment 34 into the compartment 35 through a depending tube 40 having its upper end connected to an opening in the wall 31 and its lower end projecting into the liquid space in the compartment 34. The pressure maintained in the compartment 35 is lower than the pressure in the compartment 34 so that a part of the liquid forced from the compartment 34 into the compartment 35 evaporates in the latter, the vapor being discharged through a conduit 41 communicating with the vapor space defined in the compartment 35. The liquid remaining in the compartment 35 is forced into the compartment 36 by means of a conduit 42 projecting through an opening in the wall 32 and having its lower end immersed into the liquid contained in the compartment 35 and its upper end projecting into the vapor space of the compartment 36. The conversion of liquid into vapor may be improved by reducing the pressure of the liquid within the conduit, for instance, by the provision of a nozzle-like restriction in said conduit. Such an arrangement has been shown with respect to the conduit 42 which has its upper end reduced in cross-section to form a nozzle. The velocity of the liquid passing the nozzle is thereby increased, effecting a reduction of the pressure of the liquid. The liquid is flashed or forced from the compartment 35 into the compartment 36 in which it is partly evaporated, the vapor being discharged through a conduit 43 connected to the vapor space of the compartment 36, and the liquid remaining in the compartment 36 is forced into the compartment 37 through a conduit 44 having its upper end connected to an opening in the wall 33 and its lower end immersed in the liquid space of the compartment 36. The pressure in the compartment 37 is lower than in the compartment 36 whereby a part of the liquid is evaporated in the compartment 37 and discharged through a conduit 45 communicating with the vapor space of said compartment. The flashing or forcing of the liquid into the compartment 37 and the conversion of a part of the liquid into vapor is improved in the present instance by a nozzle-like restriction 46 provided in the conduit 44.

The operation of this arrangement, as will be readily understood from the above, is similar to that of the generator arrangement in Fig. 1. Structurally it has the advantage of a more compact arrangement, necessitating less floor space and in addition brings out several features for improving the conversion of liquid into vapor by flashing or forcing the liquid through nozzle or a nozzle-like restriction from a compartment of higher pressure into a compartment of lower pressure. Furthermore, the static pressures of the liquid in compartments 35 and 37 aid to maintain the higher pressures in the compartments 34 and 36, respectively, whereas in the arrangement of Fig. 1 the static liquid pressure in the succeeding drums has no effect on the pressure in the preceding drums.

Referring now to Fig. 4, in which I have shown an elastic fluid power plant embodying my invention, the arrangement is based on the same principles and embodies the same features outlined in connection with Figs. 1 and 2. The structure includes two expansion tanks or drums connected in series to a heating tank, drum or unit. By a heating drum I mean a container for fluid which is heated, and by an expansion drum I mean a container in which a liquid conducted thereto is permitted to expand. The heating drum or unit in Fig. 4 is located within a furnace having a wall 50 and a flue 51 for discharging gases developed in the combustion chamber. A heating unit 52 for containing liquid to be heated and evaporated is located within the drum. The unit comprises a plurality of spirally wound tubes 53 having their lower ends connected in parallel to a lower header 54 and their upper ends connected in parallel to an upper header 55. Both headers are annular-shaped and define together with the tubes 53 a cylindrically-shaped combustion chamber. Fuel to be burned within the combustion chamber is supplied through a burner 56 directed downward from the top of the furnace wall. Conduits 57 and 58 are arranged adjacent the burner for conducting air to the combustion chamber to maintain combustion. The heating unit is suspended from the ceiling of the furnace by means of hooks 59 fastened to the ceiling. Liquid is conducted to the heating unit through an inlet conduit 60 connected to the lower header 54 and discharged from the unit through a conduit 61 connected to the upper header 55. The fluid contained in the heating unit is heated to a high temperature at a pressure at which little or no fluid is converted into vapor. The discharge conduit 61 connected to the upper header conducts the fluid expelled from the unit into an expansion drum or tank 62 connected to the conduit 61. The fluid is flashed or forced into the expansion tank through a nozzle 63 provided in the conduit 61 near its connection with the tank 62. The pressure in the tank 62 being lower than the pressure in the heating unit permits the fluid to expand whereby a part of it is converted into vapor, the vapor being discharged from the expansion tank 62 through a discharge conduit 64 connected to the tank. The liquid contained in the tank 62 is conducted through a conduit 65 having a U-shaped portion 66 to a second expansion tank 67 in which a pressure is maintained lower than the pressure in the first expansion tank 62. This permits a part of the liquid conducted into the tank 67 to evaporate therein, the vapor being discharged through a conduit 68 connected to the tank 67, whereas the liquid in the tank 67 is returned to and recirculated through the heating unit by means of a conduit 69 connected between the expansion tank 67 and the suction inlet of a pump 70, hereafter called circulating pump, the discharge end of the latter is connected by a conduit 71 including an inverted U-shaped portion 72 to the inlet conduit 60 of the lower header 54 of the heating unit. The heating unit 52 and the expansion tanks 62 and 67 in Fig. 4 correspond to the drums or containers 10, 11 and 12, respectively, of Fig. 1; and the pressures maintained in the heating unit and the expansion tanks may be of the orders of 300, 205 and 155 pounds per square inch absolute, respectively. The available energy of the vapor discharged from the two expansion tanks 62 and 67 respectively is transformed into mechanical energy in a consumer or consumers, in the present instance shown as two turbines 73 and 74 respectively. The turbine 73 has its inlet connected to the vapor discharge conduit 64 of the expansion tank 62, and the turbine outlet is connected by a conduit 75 to the expansion tank 67. The inlet pressure of the turbine 73 is about 205 pounds per square inch absolute which is the pressure maintained in the expansion tank 62 and the exhaust pressure of the turbine 73 is of the order of 155 pounds per square inch absolute, that is, the pressure maintained in the second expansion tank 67. The turbine 73 serves as an auxiliary to drive two pumps, the circulating pump 70 described above, and a feed pump 76 described hereafter.

The vapor produced in the second expansion tank 67 by the expansion of fluid discharged from the first expansion tank, and from the auxiliary turbine 73 is conducted through the discharge conduit 68 to the main turbine 74. The latter has an exhaust connected to a condenser 77 whence the condensate is returned to the second expansion tank by means including the above mentioned feed pump 76 and a liquid preheater 78. The condenser 77 is connected to the pump 76 by a conduit 79 and the discharge of the feed pump is connected to the inlet of the preheater 78 by a conduit 80. The preheater 78 discharges into the liquid space of the second expansion tank 67 by means of a conduit 81. The preheater 78 has been shown as comprising a single spirally wound tube arranged in concentric relation with the tubes, or conduits, forming the heating unit 52. The liquid forced through the preheater by the feed pump is heated by the combustion gases escaping from the lower end of the combustion chamber through the space defined between the heating unit and the outer wall 50. The tube or tubes of the preheater are supported by brackets 82 fastened to the wall 50. The direction of flow of liquid through the various containers has been indicated by arrows.

During operation, fluid is forced by the feed pump 76 from the condenser through the preheater 78 into the expansion tank 67. The liquid accumulating in the expansion tank is circulated by the circulating pump 70 through the U-formed tube 71, 72 into the heating unit 52 in which it is heated. The fluid is discharged from the heating unit 52 through the nozzle 63 into the expansion tank 62 in which it is partly converted into vapor, the vapor being conducted through discharge conduit 64 to the turbine 73 and the liquid being conducted through the U-shaped tube 66 into the second expansion tank 67 in which it is partly evaporated; the vapor produced in tank 67 being supplied to the main turbine 74 and the liquid which has not been evaporated being recirculated through the system. As it may happen that vapor is discharged from the expansion tank 67 or that liquid in conduit 71 evaporates therein, I provide means for discharging vapor from the U-shaped tube 72. This means has been shown in the present instance as a vent including a conduit 83 with an orifice 84 connected between the upper end of the inverted U-formed tube portion 72 and the vapor space of the first expansion tank 62. Vapor formed in the conduit 71, 72 is thereby discharged through the vent into the first expansion tank.

The upper end of the U-shaped tube portion 72 is located at a level near or slightly below the level of the upper header 55 of the heating unit. With this arrangement vent 84 prevents syphoning of the liquid through the U-shaped tube 72 and a definite liquid level is maintained in the heating unit when the plant is put out of operation. The heating unit is substantially filled at all times with liquid so that excessive heating of the tubes of the heating unit during the starting of the generator is prevented. Thus the U-shaped tube portion 72 represents in substance a means for maintaining a definite liquid level in the heating unit, while the generator is out of operation. The conduit 65 with its U-shaped portion 66 represents a means for maintaining the pressure in the first expansion tank 62. The pressure in the expansion tank 62 has to overcome the pressure in the expansion tank 67 plus an additional pressure caused by the static head due to the difference in height of the columns of liquid contained in the legs of the U-shaped conduit portion 66. The conduit portion 66 has an extension 85 located within the tank 67 at one side for discharging the liquid tangentially below the liquid level in the tank. This is advantageous because the liquid discharged from the conduit 66 gives the liquid contained within the conduit a whirling motion whereby the separation of the vapor from the liquid is facilitated. The upper part of the extension 85 is provided with a vent 86 having an orifice for discharging vapor formed in the conduit 65, 66 into the upper part of the tank 67.

Summarizing a few important features of the arrangement and its operation, the circulation of fluid through the heating elements is accomplished by pumps. The feed pump forces liquid from the condenser through the preheater into the second expansion tank, and the circulating pump circulates the liquid from the second expansion tank through the heating unit into the first expansion tank. The conversion of liquid into vapor is accomplished by heating the liquid in the heating unit and by progressively reducing the pressure of the liquid as it is passed into the successive tanks. The arrangement of Fig. 4 comprises two expansion tanks in which an intermediate and a lower pressure is respectively maintained as regards the pressure in the heating unit. With regard to the progressively stepped reduction of the pressure in successive containers or stages, a boiler of this kind may be termed a multi-stage expansion boiler. The forced circulation and the expansion principle permit high velocities of the liquid, thus effecting rapid transfer of heat thereto in the heating unit without danger of overheating the heat-conducting and fluid containing elements. The heating unit, that is, the container exposed to the heat of an external source, is prevented from emptying while out of operation by the provision of a conduit including an inverted U-shaped portion between the second or last expansion tank and the heating unit. The pressure difference between the first and the second expansion tank is maintained by means including a U-shaped conduit connected between the two tanks and containing a column of liquid. The feed pump and the circulation pump are driven by the auxiliary turbine 73 in which a substantial amount of the available energy of the vapor produced in the intermediate expansion tank 62 is utilized. The auxiliary turbine exhausts into the second expansion tank whereby all of the losses of the auxiliary turbine are retained in the boiler or generator in the form of heat energy and as such available to do work. Also, all of the losses from the circulating and feed pumps are retained in the boiler or elastic fluid generator in the form of heat. The only energy necessary to maintain circulation in a system of the kind described is the energy for overcoming the friction losses of the auxiliary turbine and the pumps. The system as regards the circulation may be said to operate without any loss of heat whatsoever. During a single circulation or cycle only a comparatively small part of the liquid is evaporated, the remaining part being recirculated. For example, the circulation of 30 pounds of mercury liquid may cause the conversion of one pound thereof into vapor, whereas the remaining 29 pounds liquid are recirculated.

The diagram shown in Fig. 3 is a temperature entropy chart for mercury, bringing out the available energy of a liquid which is heated to a certain temperature and thereafter permitted to expand progressively. Certain points and lines of the diagram have been marked, indicating the conditions of a fluid in a generator as described above in connection with Fig. 4. The fluid in the heating unit 52 of Fig. 4, confined at a pressure of 300 pounds per square inch absolute, is heated until it reaches a condition indicated by point A on the "liquid line". This is the condition at which some of the mercury will vaporize if any more heat is added or will flash into vapor if the pressure is suddenly reduced. In the latter manner from point A the fluid is expelled through the nozzle 63, in Fig. 4. Point B represents the condition of the fluid in the first expansion tank 62 in Fig. 4 having a pressure of about 205 pounds per square inch absolute. At this condition a part of the liquid mercury has flashed into vapor, this fractional part being represented by the ratio of distances $$\frac{CB}{CD}$$

The condition of the vapor portion is represented by the point D and this vapor is permitted to expand further in the auxiliary turbine having an exhaust pressure of about 155 pounds per square inch absolute. The energy available per pound of vapor in the auxiliary turbine serving to maintain the circulation of the fluid is represented by the area CDEF. The liquid which remains at the point C, that is, in the first expasion tank 62 of Fig. 4, is permitted to expand to a pressure of 155 pounds per square inch absolute in the second expansion tank. The condition of the fluid in the latter is indicated in the diagram at G, the fractional amount of liquid flashed into vapor in the second expansion tank being represented by the ratio of the distances $$\frac{FG}{FH}$$

The condition of the vapor in the second expansion tank is indicated at H. The available energy of this vapor is represented by the area FHIK, assuming an exhaust pressure for the main turbine of about 1.4 pounds per square inch absolute. The condensate conducted from the condenser 77 to the generator is then at the condition K and in passing through the preheater the condensate is heated to nearly boiling point at 155 pounds pressure at which it is discharged through the conduit 81 into the second expansion tank in which it joins the liquid part which has not been evaporated.

Referring again to the area CDEF, representing the energy available for driving the mercury feed and circulating pumps, we find that a portion only of this energy actually appears as work in pumping the liquid through the boiler. If, for example, the auxiliary turbine operates at 60% efficiency, and the mercurty pumps at 60% efficiency, the combined efficiency will be 36%, that is, 64% of the available energy represented by the above mentioned area is rejected. This energy, however, though rejected, is not lost but is still at the 155 pounds per square inch absolute pressure level, thus appearing as heat energy in the boiler at this condition and therefore being available for work in the main turbine.

Considerations based on the temperature entropy chart just described show that it is possible without excessive expenditure of energy for maintaining circulation to force enough mercury through the generator so that a very large percentage or all of the heat energy in the furnace is transmitted directly to liquid mercury. The liquid mercury moving at proper velocities through the heating unit or units picks up extremely large amounts of heat energy without danger of burning the tubes. This improves the safety and prolongs the life of the boiler. Owing to the great absorption of heat energy by the heating unit, only a comparatively small heating surface is necessary. Tests have shown that in a boiler according to my invention a liquid, such as mercury, may be circulated at velocities of 4 feet per second or more with temperatures in the combustion space as high as 3000° F., without endangering the liquid containing and conducting elements.

The temperature entropy diagram in Fig. 3 also brings out the advantage of flashing in more than one step. For example, if the reduction of pressure and consequent flashing of vapor were made in one step, that is, from point A corresponding to a pressure of 300 pounds per square inch absolute to the point L corresponding to a pressure of 155 pounds per square inch absolute, the same amount of vapor would be formed at point H, this vapor having an available energy represented by the area FHIK times the pounds of vapor at H. If the flashing is accomplished in two steps as described above, an additional amount of available energy or work is obtained represented by the area CDEF times the amount of vapor formed at D. In some cases the power from the additional amount of vapor obtained may be more than enough to maintain circulation of the fluid. The amount of vapor not used for pumping may be utilized to do external work in a high pressure stage of the main turbine.

Moreover, all the available energy obtained in the intermediate expansion tank 62 may be utilized to do external work, for example, in driving a high pressure turbine or the higher stages of such turbine, whereas the vapor discharged from the second expansion tank 67 may be used to do work in a low pressure turbine or in the low pressure stages of a turbine. Such an arrangement is shown in the embodiment of Fig. 5 which comprises a heating unit 90 provided in a furnace 91 and three expansion tanks 92, 93 and 94 located external to the furnace and corresponding to the tanks or drums 11, 12 and 13, respectively, of Fig. 1. The heating unit comprises a plurality of spirally wound tubes forming a cylindrical body whose interior defines a combustion space. The lower ends of the tubes are connected in parallel to a lower header 95 and the upper ends of the tubes are connected in parallel to an upper annular header 96. The lower header 95 has been shown as a comparatively small tank or feed chamber or distributor located centrally below the cylindrical body formed by the heating tubes with the lower ends of these tubes connected to the upper half of the tank. Liquid is conducted to the distributor 95 by a tube 97 centrally connected to the bottom portion of the tank. This arrangement of the distributor has the advantage that the lower ends of the heating tubes are substantially uniformly spaced from the supply conduit 97, resulting in a uniform flow of liquid to the heating tubes. The general arrangement of the furnace is substantially the same as that shown in Fig. 4. A burner 98 for supplying combustible material to the combustion space and conduits 99 for supplying air are held by the ceiling of the furnace, and a flue 100 for discharging gases from the conduction space defined between the heating unit and the furnace is connected to an upper portion of the furnace wall. The heating unit is supported by hooks 101 fastened to the ceiling and brackets 102 fastened to the lower portion of the furnace wall.

During operation, heat energy is transferred from the combustion chamber to the liquid passing the heating unit 90; liquid of a high temperature and high pressure is discharged from the upper header of the heating unit by a conduit 103 including a nozzle 104 into the first expansion tank. The pressure in the latter is lower than the pressure in the heating unit and this reduction in pressure permits expansion of the fluid discharged into tank 92, resulting in evaporation of a part of the fluid, the vapor being discharged from the tank 92 through a vapor discharge conduit 105, the liquid being discharged through a liquid discharge conduit 106 including a vapor trap 107 into the second expansion tank 93. The vapor trap 107 comprises a casing 108 having an inlet connected to the tank 92 and an outlet connected to the tank 93. Located in the casing 108 is a steel ball 109 to prevent vapor from flowing into the tank 93. The liquid is permitted to expand in tank 93 due to the lower pressure maintained therein, resulting in the evaporation of a part of the liquid, the vapor being discharged through a conduit 110, and the liquid being discharged through a conduit 111 including a vapor trap 112 into the third and in this case last expansion tank 94. The pressure in the latter being lower than in tank 93 permits a part of the liquid conducted thereto to evaporate. The vapor thus produced is discharged through a conduit 113 and the liquid recirculated through the heating unit. The means for conducting the liquid from the last expansion tank to the inlet conduit 97 of the heating unit comprises a conduit 114 including a circulating pump 115, a U-shaped conduit portion 116 and a heater 117 having its outlet conduit connected to the conduit 97. The heater 117 comprises a spirally wound tube concentrically arranged about the cylindrical body of the heating unit and supported by brackets 118 fastened to the furnace wall. The fluid passed through the heater is heated by the gases escaping from the lower end of the combustion space and passing through the conduction space between the heating unit and the furnace wall. The function of the inverted U-shaped conduit portion 116 is the same as that of the conduit portion 72 in Fig. 4. Vapor may be discharged from the upper end of the U-shaped conduit portion through a vent 116a comprising a conduit with an orifice connected to the tank 92. One leg of this inverted U-shaped conduit portion in the present instance is shorter because of the provision of the heater 117 located in an upper part of the furnace. It will be readily seen that the heater itself prevents emptying of the heating unit while the plant is out of operation.

The conduits 105, 110 and 113 in the present instance discharge the vapor produced in the three expansion tanks to the first, an intermediate and a lower pressure stage of a mixed pressure turbine 119. A part of the available heat energy of the vapor discharged through conduits 110 and 113 is transmitted to another fluid, such as water, for producing steam. This is accomplished by the provision of surface heat exchangers 120 and 121. Each heat exchanger has an outer casing 122 connected to the conduits 110 and 113 respectively. Disposed within the casings are a plurality of tubes 124 connected to headers 125 and 126. The two surface heat exchangers 120 and 121 are connected in series by a conduit 127. The outer tanks have discharge conduits 128 and 129 which in substance form extensions of conduits 110 and 113 respectively for discharging the vapor to the intermediate and lower stages respectively of the turbine 119. The exhaust of the turbine is conducted through a conduit 130 into a condenser 131 which has been shown in the present instance as another surface heat exchanger. Water or like medium is conducted to the latter through a conduit 132 and discharged therefrom through a conduit 133 into the surface heat exchanger 121. The three surface heat exchangers thus are connected in series as regards the flow of water or like medium therethrough. The condensate is discharged from the surface heat exchanger 131, usually termed a condenser boiler, through a conduit 134 connected to the inlet of a feed pump 135. The discharge of the latter is connected by a conduit 136 to a preheater 137 discharging into the last expansion tank 94 by a conduit 138. The preheater 137 is located in the conduction space of the furnace; liquid passed therethrough being heated by gases escaping from the lower end of the combustion chamber.

The feed pump 135 and the circulation pump 115 are provided on a common shaft and driven by an electric motor or power agency 139 connected to an electric source of supply 140.

During operation liquid is forced by the feed pump 135 through the preheater 137 into the tank 94, whence liquid is circulated through the circulating pump 115, the heater 117, the heating unit 90, whence it is discharged into the successive expansion tanks 92, 93 and 94. Progressively stepped reduction of pressure in these tanks permits evaporation of the liquid, the vapor being conducted into the turbine and the liquid remaining in tank 94 being recirculated through the system. Water or like medium is conducted to the condenser boiler 131 in which it is heated and vaporized and whence it is conducted successively through the surface heat exchangers 121 and 120. The heated fluid, such as steam, is discharged from the surface heat exchanger 120 by a conduit 141 whence it is supplied to a consumer, such as a steam turbine, not shown. The arrangement of the surface heat exchangers may be such that the fluid is being superheated as it passes the last surface heat exchanger 120.

With my invention I have accomplished an improved construction and arrangement for heating and evaporating a fluid. The arrangement permits a more economic and efficient operation of elastic fluid power plants, more economic because less radiation surfaces are necessary and more efficient because it permits higher temperature in the combustion chamber and the generation of vapor by a progressively stepped reduction in pressure in a plurality of series-connected expansion chambers.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In an elastic fluid power plant, the combination of a series of containers for fluid to be evaporated, a source of heat energy for heating the fluid in the first of the containers, the other containers being connected in series to the first container and arranged to cause fluid conducted from the first into the other containers to expand at progressively reduced pressures in the successive containers, a separate vapor discharge conduit for each of said other containers, conduit means including a pump and an inverted U-shaped conduit portion for recirculating liquid fluid from the last container through the first container, the upper end of the U-shaped conduit portion being located near the liquid level in the first container, and a vent at the upper end of the U-shaped portion for discharging vapor therefrom into one of the expansion containers, and means for driving the pump including an elastic fluid consumer having an inlet connected to one of the expansion containers and an exhaust connected to one of the expansion containers succeeding the last mentioned container.

2. In an elastic fluid power plant, the combination of a series of containers for fluid to be evaporated, a source of heat energy for heating the fluid in the first of the containers, the other containers being connected in series to the first container for permitting fluid conducted from the first into the other containers to expand at progressively reduced pressures in the successive containers, a separate vapor discharge conduit for each of said other containers, conduit means including a circulating pump for recirculating liquid fluid from the last container through the first container, and an elastic fluid turbine having an inlet conduit connected to one of said containers, and an outlet conduit connected to another of said containers for driving said circulating pump.

3. In an elastic fluid power plant, the combination of a series of containers for fluid to be evaporated, a source of heat energy for heating the fluid in the first of the containers, the other containers being connected in series to the first container for permitting fluid conducted from the first into the other containers to expand at progressively reduced pressures in the successive containers, a vapor discharge conduit for each of said other containers, conduit means including a circulating pump for recirculating liquid fluid from the last container through the first container, other conduit means including a feed pump and a liquid preheater for conducting fresh fluid to the last container, an elastic fluid turbine having an inlet conduit connected to one of the other containers for driving the two pumps, and a conduit for conducting the exhaust of said turbine to the last container.

4. In an elastic fluid power plant, the combination of a furnace, a heating unit for fluid to be evaporated located in the furnace, a first expansion tank located external to the furnace and connected to the outlet of the heating unit for partly converting liquid discharged from the unit into vapor, a vapor discharge conduit and a liquid discharge conduit for the first expansion tank, a second expansion tank connected to the liquid discharge conduit for partly converting liquid discharged from the first tank into vapor, a consumer connected to the first-named vapor discharge conduit, means driven by the consumer for recirculating liquid from the second expansion tank through the unit, and another elastic fluid consumer connected to the second expansion tank.

5. In an elastic fluid power plant, the combination of a furnace, a heating unit for fluid to be evaporated located in the furnace, a first expansion tank located external to the furnace and connected to the outlet of the heating unit for partly converting liquid discharged from the unit into vapor, a vapor discharge conduit and a liquid discharge conduit for the expansion tank, a second expansion tank connected to the liquid discharge conduit for partly converting liquid discharged from the unit into vapor, a consumer connected to the first-named vapor discharge conduit, means for recirculating liquid from the second expansion tank through the unit, another elastic fluid consumer connected to the second expansion tank, a condenser connected to the last-named consumer, and means including a pump driven by the first-named consumer and a preheater for conducting liquid from the condenser to the second expansion tank.

6. A multi-stage expansion boiler comprising a heating element, a source of radiant heat for the element, a plurality of containers for fluid to be evaporated connected in series to the heating element for progressively converting heated liquid discharged from one container into a succeeding container into vapor, each container having a conduit for discharging vapor, means for maintaining a pressure difference between succeeding containers, pump means connected to the containers for maintaining the circulation of fluid, and an auxiliary turbine connected between two containers for driving the pump means.

7. A multiple stage expansion boiler comprising a heating element containing mercury and maintained at such a pressure that there is substantially no vapor therein, a source of radiant heat for said element, a plurality of containers for mercury to be evaporated connected in series to the heating element for progressively converting heated mercury discharged therein into vapor, each container having a conduit for discharging vapor, means for maintaining a pressure difference between said heating element and each of said containers, pump means for maintaining circulation of mercury in the heating element, and means including an elastic fluid consumer connected to the vapor discharge conduit of the container adjacent the heating element for driving the pump means.

LUCIAN A. SHELDON.